United States Patent [19]

Thomsen et al.

[11] Patent Number: 4,956,086

[45] Date of Patent: Sep. 11, 1990

[54] FILTER CARTRIDGE WITH A LUGGED CONCENTRIC CLOSURE PORTION

[75] Inventors: Jack W. Thomsen, LaGrange Park; Perialwar Regunathan, Wheaton; John W. Tadlock, West Chicago, all of Ill.

[73] Assignee: Everpure, Inc., Westmont, Ill.

[21] Appl. No.: 363,630

[22] Filed: Jun. 8, 1989

Related U.S. Application Data

[63] Continuation-in-part of Ser. No. 257,338, Oct. 13, 1988, Pat. No. 4,857,189.

[51] Int. Cl.[5] ............................................. B01D 27/08
[52] U.S. Cl. .................................. 210/232; 210/440; 210/444; 210/450; 210/497.01; 210/DIG. 17; 55/502; 55/504; 55/506
[58] Field of Search ............... 210/232, 236, 238, 440, 210/444, 450, 497.01, DIG. 17; 55/490, 495, 502, 504, 506, 508

[56] References Cited

U.S. PATENT DOCUMENTS

| | | | |
|---|---|---|---|
| 3,746,171 | 7/1973 | Thomsen | 210/234 |
| 4,051,036 | 9/1977 | Conrad et al. | 210/DIG. 17 |
| 4,052,307 | 10/1977 | Humbert, Jr. | 210/DIG. 17 |
| 4,349,438 | 9/1982 | Sims | 210/238 |
| 4,529,515 | 7/1985 | Selz | 210/238 |
| 4,719,012 | 1/1988 | Graezinger et al. | 210/232 |
| 4,735,716 | 4/1988 | Petrucci et al. | 210/232 |
| 4,781,830 | 11/1988 | Olsen | 210/232 |
| 4,857,189 | 8/1989 | Thomsen et al. | 210/232 |

Primary Examiner—Peter Hruskoci
Assistant Examiner—Wanda L. Millard
Attorney, Agent, or Firm—Frank R. Thienpont

[57] ABSTRACT

A filtering system for water treatment including a head member having inlet and outlet ports and replaceable, disposable filter cartridge for insertion into the head member, the filter cartridge including a dual lug retaining system for retaining the filter cartridge in the head member, one of said lug retaining systems being disposed on the pressure vessel of the filter cartridge and the other of said lug retaining systems being disposed on the closure member of the filter cartridge.

5 Claims, 4 Drawing Sheets

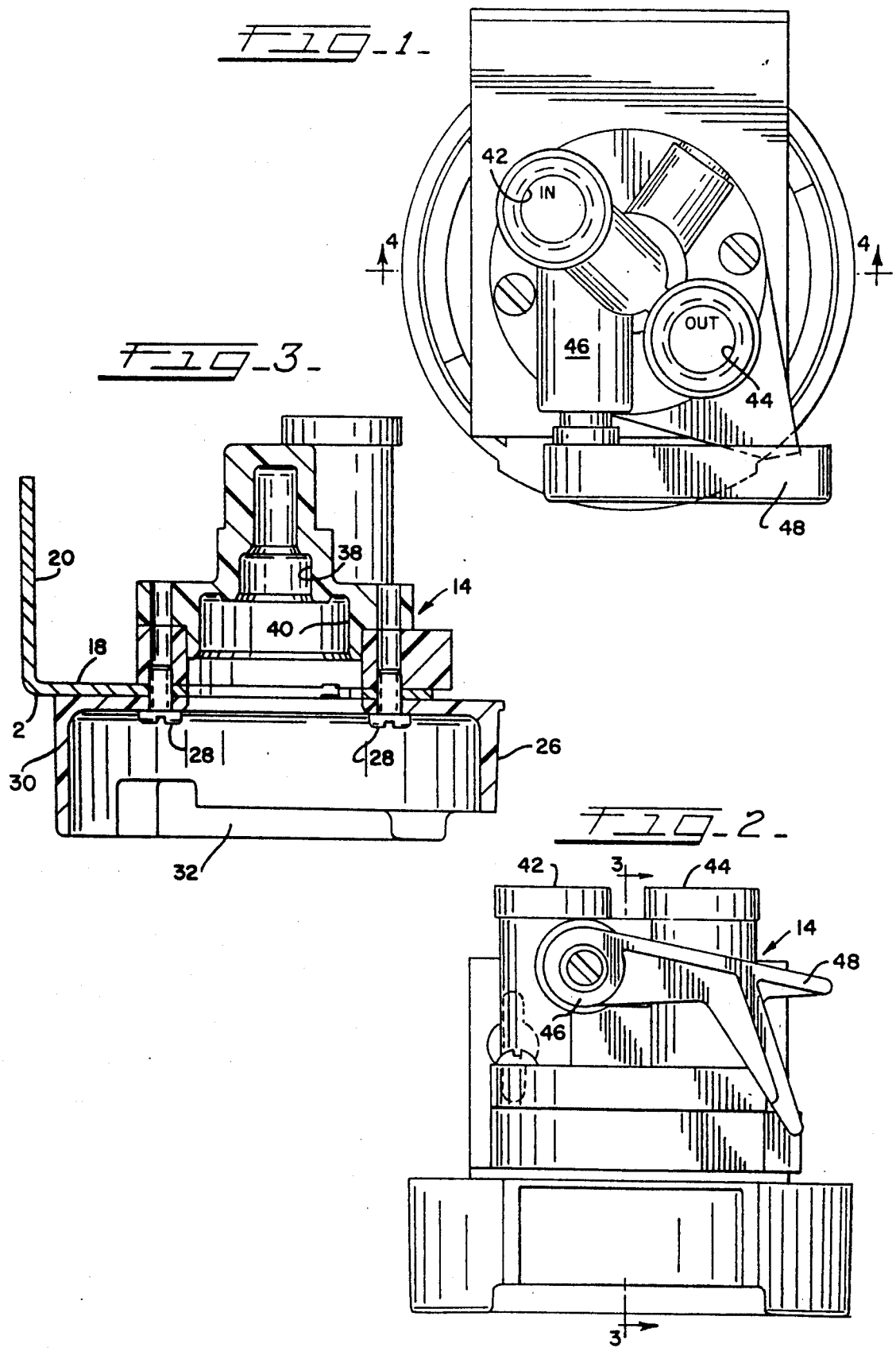

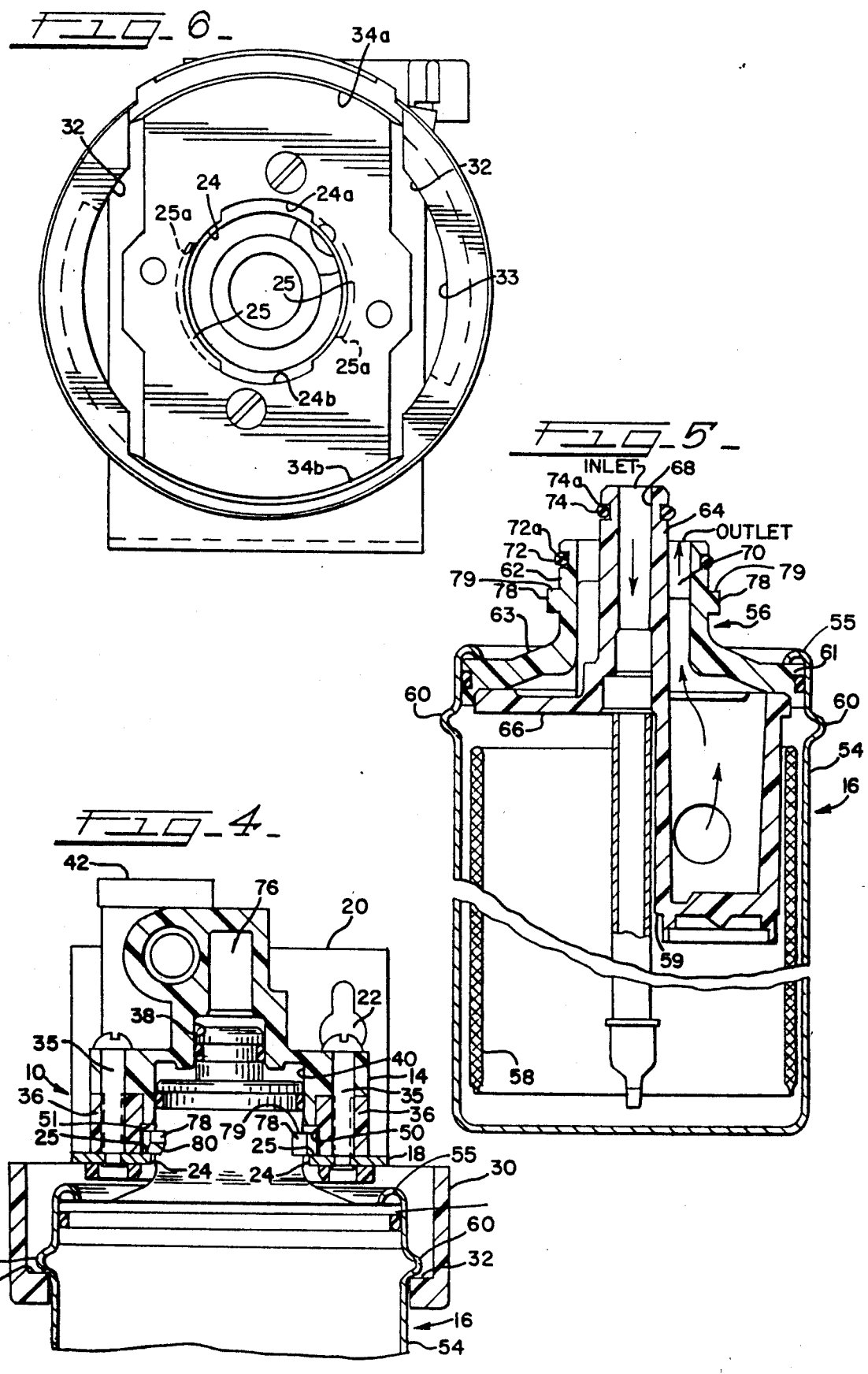

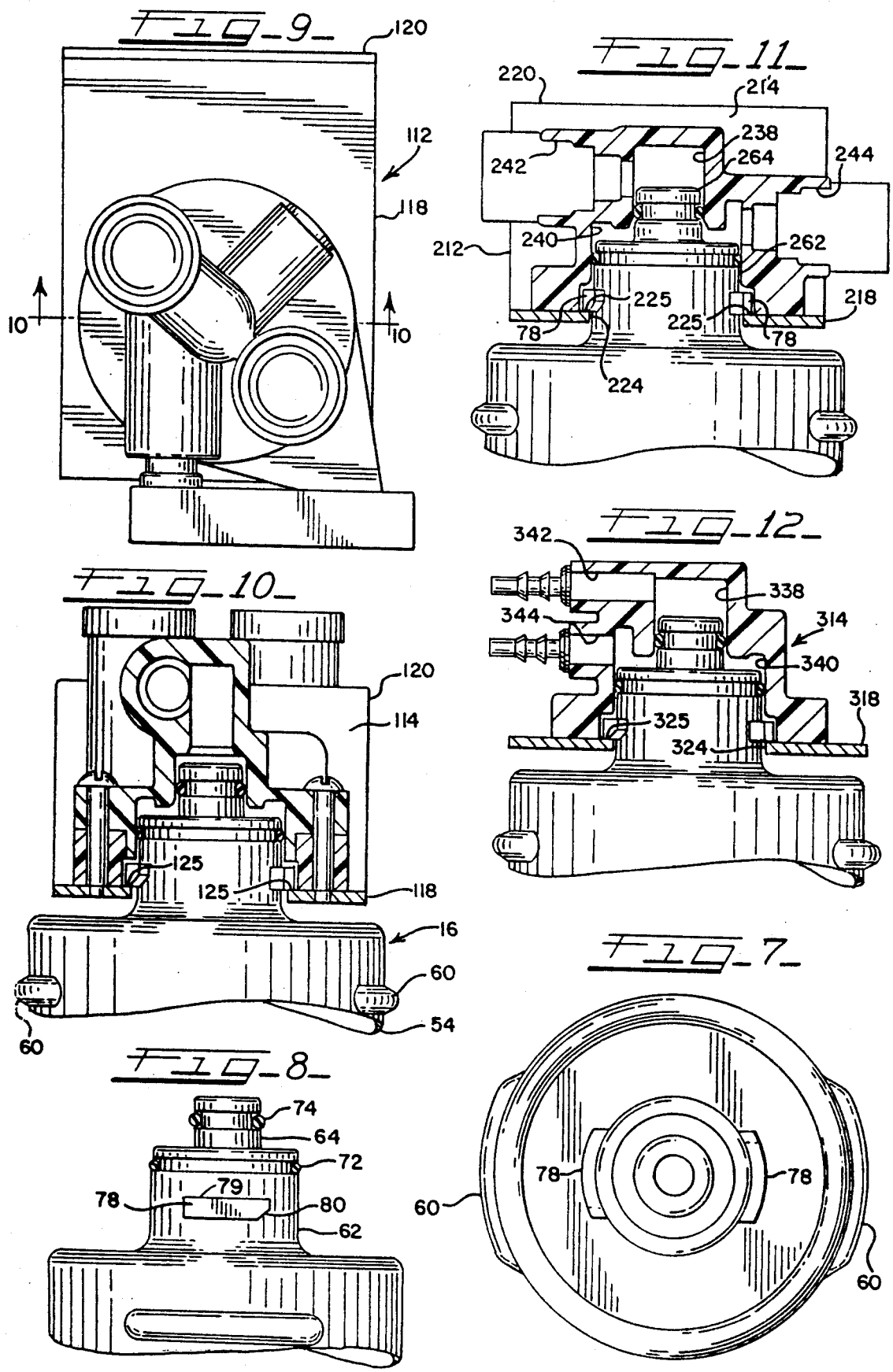

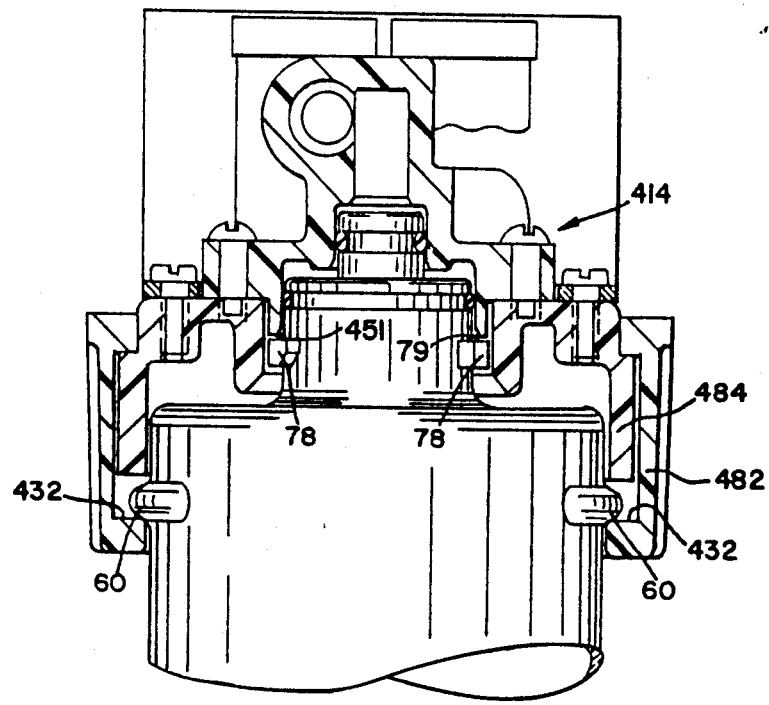
FIG_13

FILTER CARTRIDGE WITH A LUGGED CONCENTRIC CLOSURE PORTION

This is a continuation-in part-application of Ser. No. 257,338 for a Filter Cartridge with a Lugged Concentric Closure Portion filed on Oct. 13, 1988, now issued as U.S. Pat. No. 4,857,189.

BACKGROUND OF THE INVENTION

This invention relates to a filtering system in which a disposable and replaceable filter cartridge can be quickly inserted into and removed from a head member which is permanently mounted in a fluid conduit, and more particularly to an improved filter cartridge which provides for a more secure installation in a filter head as well as providing a capability of allowing installation in different types of head members.

Filtering systems of the general type as described herein, are disclosed in U.S. Pat. Nos. 3,746,171 and 4,654,142 assigned to the same assignee as this application. U.S. Pat. No. 3,746,171 discloses a filter cartridge which is secured in the mating head of a filter assembly by means of ridge formations formed on the canister of the filter cartridge. U.S. Pat. No. 4,654,142 discloses another style of filter cartridge which is secured in a head by lugs formed on a closure member.

SUMMARY OF THE INVENTION

A principal object of the invention is to provide an improved filter assembly by providing a stronger support for the filter cartridge in the associated filter head member.

Another object of the invention is to provide an improved means for supporting a replaceable filter cartridge in a head member utilizing bayonet lugs on the filter cartridge pressure vessel and bayonet lugs on the filter cartridge closure member.

Another object of the invention is to provide an improved filter cartridge which may be secured into a plurality of differently constructed head members utilizing one or the other or both of the lug systems incorporated in the filter cartridge depending on the style of filter head being used.

Other objects and advantages of the invention will become more apparent when considering the accompanying description and drawings.

BRIEF DESCRIPTIONS OF THE DRAWINGS

FIG. 1 is a top plan view of the head member of a filter assembly embodying the invention herein;

FIG. 2 is a side view in elevation of the head member of FIG. 1;

FIG. 3 is a sectional view in elevation taken along line 3—3 of FIG. 2;

FIG. 4 is a sectional view in elevation of the head member of FIG. 1 taken along line 4—4 of FIG. 1 together with a filter cartridge inserted therein and held in place by a dual lug system;

FIG. 5 is a sectional view in elevation of a filter cartridge as shown in FIG. 4;

FIG. 6 is a bottom plan view of the head member of FIG. 2;

FIG. 7 is a plan view of the filter cartridge of FIG. 5;

FIG. 8 is a view in elevation of the upper end of the filter cartridge of FIG. 4 but rotated to a position 90 degrees from the position of the cartridge of FIG. 4;

FIG. 9 is a top plan view of another type of head member of a filter assembly;

FIG. 10 is a sectional view in elevation of the head member of FIG. 9 taken along line 10—10 of FIG. 9 together with a filter cartridge disposed therein and held in place only by the lug system disposed on the closure member;

FIG. 11 is a sectional view in elevation of another style of head member showing a filter cartridge embodying the invention disposed therein;

FIG. 12 is a sectional view in elevation of still another style of head member showing a filter cartridge embodying the invention disposed therein;

FIG. 13 is a sectional view in elevation of another type of head member showing a filter cartridge disposed therein and held in place only by the lug system disposed on the canister portion of the filter cartridge.

DESCRIPTION OF THE PREFERRED EMBODIMENT

Referring now to the drawings wherein like reference characters refer to like parts, in the embodiment shown in FIGS. 1-6 a filter assembly 10 includes a support member 12 for supporting a head member and a filter cartridge, a head member 14 secured to the support member and a filter cartridge 16 which is inserted into and secured in the head member.

The support member 12 includes a generally laterally extending plate member 18 and also may include a generally vertically extending integral portion 20 attached to the plate member 18. The portion 20 may be mounted to a wall or other supporting structure by suitable means such as openings 22 for accepting a bolt or other fastening means to attach the filter assembly to a supporting structure.

A circular opening 24 is formed in the laterally extending plate member 18 for receiving therethrough the upper end of the filter cartridge 16. A pair of oppositely disposed bayonet openings 24a and 24b are connected to the opening 24 for receiving therethrough corresponding bayonet lugs formed on the filter cartridge closure member as more fully explained below. Ledges 25 formed by the edges of circular opening 24 provide support for bayonet lugs formed on the closure member. Stop means 25a located at the ends of the ledges on the head member are provided to position and limit the rotation of the filter cartridge to approximately a quarter turn after insertion into the head member.

A ring member 26 is attached to the lower surface of the laterally extending plate member 18 by suitable means such as screws 28. The ring member 26 is formed with a depending skirt, portion 30. At the lower end of the skirt portion 30 radially inwardly directed ledge means 32 are formed defining a circular opening 33 for receiving therethrough the filter cartridge 16. Oppositely disposed bayonet openings 34a and 34b are formed in the ledge means to accomodate the passage therethrough of ridges or lugs formed on the pressure vessel portion of the filter cartridge when the latter is inserted into the head member.

The head member 14 preferably made of a molded plastic is secured to the upper face of the support member 12 by bolts 35 or other suitable means, a spacer member 36 being positioned between the head member and plate member 18 as a manufacturing accomodation. The head member 14 is formed with a pair of concentrically disposed bores 38 and 40 which are designed to accept the upper end of the filter cartridge. The head member 14 also is formed with vertically extending inlet and outlet ports 42 and 44, respectively, which are adapted to be connected in a fluid conduit by appropriate plumbing accessories. A hand operated valve 46 controls the inlet 42 through activation of the valve lever 48. A counterbore 50 is formed in the spacer member 36 to accomodate the cartridge supporting lug members formed on the closure member of the filter cartridge.

The filter cartridge 16 includes a pressure vessel 54, a closure member 56, and a filter element 58 disposed in the pressure vessel and attached to the closure member. The filter cartridge unit may be designed as a unitary disposable unit which can be easily inserted into the head member 14 and removed therefrom by hand without the use of special tools. The filter cartridge also may be designed in such a manner that the separate parts such as the pressure vessel, closure member and filter element may be separately replaced if desired.

The pressure vessel 54 may be of metal or plastic and is closed at its lower end. The closure member 56 is sealingly fitted into the open end of the pressure vessel by appropriate means. A pair of laterally extending ridges or lugs 60 are formed at the upper end of the pressure vessel and these coact with the ledge means 32 on the ring member 26 to retain and secure the filter cartridge in the head member.

The closure member 56 is generally similar to the closure member disclosed in U.S. Pat. No. 3,746,171 assigned to the same assignee as this application, but is different in particular in that additional bayonet lug members are provided on closure member 56 for retaining the filter cartridge in a head member.

The closure member 56 which preferably is made of a plastic material includes an annular rim portion 61 which is the portion sealingly fitted into the open end of the pressure vessel. The closure member 56 also includes a centrally disposed annular projecting tubular portion 62 of relatively larger diameter which is connected to the rim portion 61 by web portion 63. A tubular portion 64 of relatively smaller diameter extends through and is coaxially disposed with the tubular portion 62 and extends axially beyond the tubular portion 62. The tubular portion 64 is connected to and secured in the closure member by radially extending web portions 66. The tubular portion 64 defines a fluid passage 68 which in the embodiment shown in FIGS. 4 and 5 is an inlet fluid passage which communicates with inlet port 42 in the head member 14. The relatively larger tubular portion 62 is radially spaced from tubular portion 64 to define therebetween fluid passage 70 which communicates with outlet port 44 in the head member 14.

O-ring seals 72 and 74 are disposed in recesses 72a and 74a on tubular portions 62 and 64, respectively, to form a seal with bores 40 and 38 when the filter cartridge 16 is inserted into the head member 14. When inlet fluid enters inlet port 42 and valve 46 is open, it flows into inlet chamber 76 and then through fluid passageway 68 and into the pressure vessel.

A pair of oppositely disposed bayonet lugs 78 are formed on the outer periphery of tubular portion 62. These lugs 78 act in cooperation with plate 18 as shown in FIG. 4 to retain the filter cartridge 16 in the head 14. The lugs 78 are formed with a tapered end 80 to assist in rotating the cartridge approximately 90 degrees to a secured position in the head member 14. The tapered ends 80 assist the lugs 78 to move into engagement with the plate-like member 18 of the support member 12 after the head member has been inserted through the opening 24.

As best shown in FIG. 7, it will be observed that the lugs 78 on the closure member 56 and the ridges or protrusions 60 on the pressure vessel lie in the same vertical plane taken through the axis of the closure member and pressure vessel. Thus, when the filter cartridge has been inserted in the head member, both the lugs 78 resting on the plate 18 and the ridges 60 resting on the ledges 32 provide support for filter cartridge in the head member 14.

The filter element in the pressure vessel may be any one of a variety of such elements. One such filter element, for example, may be a folded or pleated filter septum 58 as also disclosed in FIGS. 9 and 12 of U.S. Pat. No. 4,654,142. The filter septum is connected to and supported on a septum support tube 59. The latter then functions as a support and as an outlet from the filter septum 58.

The improved filter cartridge 16 has additional advantages. Besides being usable in a head member 14 as shown in FIGS. 1–4 it may also be used with other types of head members as illustrated in FIGS. 9–13 where the filtration system as a whole may dictate the use of head members as there shown.

In FIGS. 9–10 there is shown a head member 114 which is only slightly different than the head member 14 shown in FIG. 3. Head 114 of FIGS. 9 and 10 does not carry a ring member 26 so that the ridges 60 on the pressure vessel do not provide any support. The filter cartridge is supported in the head member by the bayonet lugs 78 which rest on the ledges 125 defined by the circular opening in the laterally extending plate-like member 118 of the support member 112 which is the same as support member 12 shown in FIGS. 1–4, 6.

In FIG. 11 another type of head member 214 is shown. The filter cartridge 16 is supported in head member 214 in the same manner as in the embodiment of FIG. 10. Only the lugs 78 on the closure member 56 of the filter cartridge are used to support the latter in the head member by coacting with the ledges formed by the opening 224.

The head member 214 preferably made of a molded plastic and of generally annular construction is secured to the upper face of the bracket member 212 by bolts or other suitable means. Here again the head member 214 is formed with concentrically disposed internal bores 238 and 240 for receiving the upper end of the closure member 56 defining the tubular portions 64 and 62, respectively. The head member also is formed with horizontally disposed inlet and outlet ports 242 and 244 which are adapted to be connected in a fluid conduit by appropriate plumbing accessories. The inlet port 242 communicates with bore 238 and fluid passage 68 formed in the closure member 56. The outlet port 244 communicates with bore 240 and outlet fluid passage 70 formed in the closure member.

In FIG. 12 another slightly different form of head member 314 is shown. It is most like the head member of FIG. 11, the primary difference being that the inlet and outlet ports 342 and 344, respectively, are both formed to one side of the head member. Here again the lugs 78 on the closure member are used to support the filter cartridge on the ledges 325 provided by the circular opening 324 in the plate member 318 to which the head member 314 is secured by bolts or other suitable means. Here again the head member 314 is formed with concentrically disposed bores 338 and 340 for receiving the upper end of the closure member 56 defining the tubular portions 64 and 62, respectively. The inlet port 342 communicates with bore 338 and fluid passage 68 formed in the closure member 56. The outlet port 344 communicates with bore 340 and outlet fluid passage 70 formed in the closure member.

In FIG. 13 still another form of head member 414 is shown. This head member basically is similar to the head member disclosed in U.S. Pat. No. 3,746,171. In this particular head member the lugs 78 on the closure member are inactive insofar as supporting the cartridge in the head is concerned. The filter cartridge 16 is held in place in the head member by the coaction of the ridges or lugs 60 on the pressure vessel and ledges 432 formed on a clamping collar 482. This clamping collar is adapted to move axially on the annular skirt 484 by means of cooperating cam structure (not shown) on the collar 482 and skirt 484.

Further hydrostatic tests on units as shown in FIGS. 4 and 13 have demonstrated additional advantages. Pressure tests show that in assemblies as shown in FIGS. 4 and 13, i.e., where lugs 60 are used to help support the cartridge in the filter head, as pressure builds up it acts on the underside of the rim portion 61 of the closure member which is secured in the upper end of the pressure vessel. With the particular construction as shown in FIG. 4 the pressure vessel is supported in the ring member 30 by the lugs 60 which rest on the ledges 32. As the pressure builds up in the pressure vessel it tends both to force the pressure vessel downwardly and the closure member upwardly. The lugs 60, of course, prevent the downward movement of the pressure vessel out of its supported position. The pressure also acting on the underside of the rim portion 61 of the closure member tends to move the closure member slightly upwardly but this upward movement is impeded by the lugs 78, the upper surface 79 of which, during the upward movement, abuts against the shoulder 51 defined by the counterbore 50 formed in the head as shown in FIG. 4 thus limiting the overall upward movement of the closure member. With any substantial increases in pressure, if it were not for the lugs 78 abutting against the shoulder 51, the closure member may tend to move further upwardly and out of the pressure vessel, in the process bending or fracturing the rolled over portion 55 of the pressure vessel with leakage resulting. The lugs 78, however, limit such upward movement of the closure member. As a result, the pressure integrity of the pressure vessel is enchanced by 40% to 50%. It has been found, for example, that hydrostatic pressures of approximately 750 p.s.i. could be attained, while in structures without the lugs 78 pressures of only about 500 p.s.i. could be achieved before fracture of the upper end of the pressure vessel resulted with attendant leakage.

While certain preferred embodiments of the invention have been disclosed, it will be appreciated that these are shown by way of example only, and the invention is not to be limited thereto as other variations will be apparent to those skilled in the art and the invention is to be given its fullest interpretation within the terms of the following claims.

What is claimed is:

1. A filter cartridge for insertion into a filter head having fluid inlet and outlet ports and adapted to be permanently mounted in a fluid conduit comprising:

(a) a pressure vessel closed at one end and adapted to have a filter element disposed therein;

(b) a closure member in sealed relationship with the open end of said pressure vessel,
said closure member being formed with inlet and outlet ports therein for communicating with inlet and outlet ports in a filter head with which the filter cartridge is adapted to be associated,
said closure member also being formed with a pair of unequal diameter concentrically disposed axially projecting tubular portions which define inlet and outlet ports to and from the pressure vessel, one of said tubular portions extending axially beyond the other;

(c) a first pair of laterally extending oppositely disposed lug members formed on the outer surface of said pressure vessel;

(d) a second pair of laterally extending oppositely disposed lug members formed on the outer surface of the tubular portion having the larger diameter; and (e) means formed on said second pair of lug members for coacting with a portion of a filter head with which the filter cartridge is adapted to be associated, said means formed on said second pair of lug members being adapted to function in coaction with a filter head to restrict potential axial movement during operation and under pressure of said closure member relative to said pressure vessel.

2. A filter cartridge for insertion into a filter head adapted to be permanently mounted in a fluid conduit comprising:

a pressure vessel adapted to have a filter element disposed therein;

a closure member in sealed relationship with the open end of said pressure vessel, said closure member being a generally annular shaped body and including
an annular rim portion and first and second tubular portions, said three portions all being coaxially disposed,
a web portion interconnecting said rim portion and said second tubular portion,
said second tubular portion extending axially beyond said rim portion, and said first tubular portion extending axially beyond said second tubular portion,
said first and second tubular portions being radially spaced from each other to define an opening therebetween,
said first tubular portion also defining an opening therethrough,
said openings defining inlet and outlets ports to lead to and from the pressure vessel;

a first pair of laterally extending lug members associated with the outer surface of said pressure vessel;

a second pair of laterally extending lug members associated with the outer surface of said closure member; and means formed on said second pair of lug members associated with the outer surface of said closure member for coacting with a portion of a filter head with which the filter cartridge is adapted to be associated, said means formed on said second pair of lug members being adapted to function in coaction with a filter head to restrict potential axial movement during operation and under pressure of said closure member relative to said pressure vessel.

3. In a filter assembly the combination comprising:
(a) a head member adapted to be disposed in a fluid conduit and adapted to have a filter cartridge inserted thereinto, said head member including annular bore means formed therein and inlet and outlet ports formed therein and communicating with said annular bore means;
(b) a filter cartridge including
  (1) a pressure vessel closed at one end and adapted to have a filter element disposed therein,
  (2) a closure member in sealed relationship with the open end of said pressure vessel, said closure member being formed with two concentrically disposed axially projecting portions, one portion projecting beyond the other, and including inlet and outlet ports therein for communicating with the inlet and outlet ports in said head member,
  (3) a first pair of laterally extending oppositely disposed lug members disposed on the outer surface of said pressure vessel near the upper end thereof,
  (4) a second pair of laterally extending oppositely disposed lug members disposed on the outer surface of the larger diameter projection on said closure member;
(c) means associated with said head member for coacting with at least one of said pairs of lug members for supporting said filter cartridge in said head member; and
(d) means formed on said head member for coacting with said lug members formed on the outer surface of said closure member for restricting potential axial movement during operation and under pressure of the closure member relative to the pressure vessel.

4. The combination of claim 3 wherein
said means formed on said head member restricts the potential upward axial movement of the closure member relative to the pressure vessel.

5. The combination of claim 3 wherein
said means formed on said head member comprises abutment means with which said lug members may coact.

* * * * *